US006499059B1

(12) United States Patent
Banzhaf

(10) Patent No.: US 6,499,059 B1
(45) Date of Patent: Dec. 24, 2002

(54) METHOD OF CONTROLLING A NETWORK ELEMENT USING A SERVICE PROFILE AND APPARATUS OF THE SAME

(75) Inventor: Monika Banzhaf, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/310,862

(22) Filed: May 13, 1999

(30) Foreign Application Priority Data

May 20, 1998 (DE) .......................................... 198 22 553

(51) Int. Cl.[7] .............................................. G06F 15/16
(52) U.S. Cl. ........................ 709/229; 709/202; 709/217; 709/223; 709/226; 709/100; 709/104; 709/316; 707/10
(58) Field of Search ................................ 709/200–203, 709/217–219, 220, 223–225, 226, 227–229, 231, 100–102, 104, 316; 707/1, 9–10, 102; 713/201–202

(56) References Cited

U.S. PATENT DOCUMENTS

| | | | | |
|---|---|---|---|---|
| 5,678,041 A | * | 10/1997 | Baker et al. ................. | 709/229 |
| 5,864,676 A | * | 1/1999 | Beer et al. ................... | 709/229 |
| 6,051,032 A | * | 4/2000 | Harrison et al. .............. | 717/11 |
| 6,081,826 A | * | 6/2000 | Masuoka et al. ............ | 709/100 |
| 6,163,544 A | * | 12/2000 | Andersson et al. .......... | 709/220 |
| 6,199,113 B1 | * | 3/2001 | Alegre et al. ................ | 709/229 |
| 6,226,678 B1 | * | 5/2001 | Mattaway et al. ........... | 709/227 |
| 6,282,568 B1 | * | 8/2001 | Sondur et al. .............. | 709/223 |
| 6,338,070 B1 | * | 1/2002 | Nusch et al. ................ | 709/223 |

FOREIGN PATENT DOCUMENTS

WO    WO 97/24836    7/1997    .......... H04L/12/24

OTHER PUBLICATIONS

Hans Peter Messner, PC–Hardwarebuch, , Aug. 5, 1998, pp. 89–102.
S. Colombo, et al., "Technologies der SDH–Netzelemente: die Software–Platform", Elektrisches Nachrichtenwesen, 4th Quarter 1993, pp. 322–328.
CCIT Recommendation X.720 (01/92).

* cited by examiner

*Primary Examiner*—Bharat Barot
(74) *Attorney, Agent, or Firm*—Sughrue Mion, PLLC

(57) ABSTRACT

A network element (NE) for a communications network, particularly for a synchronous digital communications system, is disclosed. It comprises a controller (CT) which contains a processor (CPU) for executing an access request (REQ), a memory (MEM) in which managed objects (MO) are stored, and an access unit (ACC) for receiving the access request (REQ). The controller controls the network element by means of the managed objects (MO). The managed objects are images of the static and dynamic properties of resources of the network element (NE). The memory (MEM) stores a service profile (PRO) which contains information about access rights to the managed objects (MO). Before executing the access request (REQ), the processor (CPU) checks whether access rights to managed objects (MO) needed to execute the access request (REQ) are present. This permits more flexible and less error-prone management of the access rights to managed objects, particularly during communication between managed objects.

9 Claims, 3 Drawing Sheets

...

METHOD OF CONTROLLING A NETWORK ELEMENT USING A SERVICE PROFILE AND APPARATUS OF THE SAME

BACKGROUND OF THE INVENTION

This invention relates to a network element as set forth in the preamble of claim 1, to a method of controlling a network element as set forth in claim 7, and to a controller for a network element as set forth in the preamble of claim 9.

Network elements are pieces of equipment in a communications network which serve, for example, to establish connections within the network, provide access to the network, switch connections in the network, or change the format of messages which are transmitted in the network. In a synchronous digital communications network based on the synchronous digital hierarchy (SDH) or in Synchronous Optical Networks (SONETs), the network elements include crossconnects, add/drop multiplexers, and line multiplexers.

Such network elements contain a controller for controlling and monitoring network-element-specific functions. In an article by S. Colombo et al, "Technologie der SDH-Netzelemente: die Software-Platform", Elektrisches Nachrichtenwesen, $4^{th}$ Quarter 1993, pp. 322–328, it is described that network elements operate and are controlled in accordance with an object-oriented specification which was defined by international standards committees such as CCITT (now ITU-T), ETSI, or ANSI. Functions of the network elements are described and implemented in the form of managed objects (MO).

Managed objects are real life images—and thus descriptions of static and dynamic properties—of physical or virtual components (resources) of the network element. In CCITT Recommendation X.720 (01/92), a managed object is defined as an abstraction of data processing and data processing resources (e.g., protocol state machines, connections, and modems) for the purposes of management.

According to the above article by S. Colombo et al, the controller of a network element comprises:

processor hardware consisting of CPU, memory, and permanent ("persistent") storage;

a processor platform with OSI stack, operating system, data management, interprocess communication, and defense functions;

a so-called framework, which has a common application program interface (API) for managed object implementation; and a number of network element functions which are implemented by managed objects.

The "framework" incorporates an attribute library, which provides services for accessing the managed objects, such as SET, GET, REPLACE, CREATE or DELETE. It further provides an interobject communication service, which controls communication between different managed objects.

A disadvantage of this approach is that access rights, which determine which access services are permitted for the individual managed objects, have to be taken into account in the programming of the network element functions in each individual case and encoded into the source code of the object classes (applications). This is complicated and prone to error.

SUMMARY OF THE INVENTION

It is an object of the invention to provide a network element, a controller for a network element, and a method of controlling a network element which permit more flexible and less error-prone management of the access rights of managed objects.

This object is attained with respect to the network element by the features of claim 1, with respect to the method by the features of claim 7, and with respect to the controller by the features of claim 9. Further advantageous aspects of the invention are defined in the dependent claims.

The invention simplifies the management of access rights during communication between managed objects.

A particular advantage of the invention is that the functionality of a network element can be extended or restricted without making any changes to hardware and software, simply by loading new service profiles. This makes it possible to provide a network element version with standard functions and a version with extended functions using identical hardware and software.

A further advantage of the invention is that by means of service profiles it is possible to hide entire managed-object classes from one or more user groups and to make this class accessible by, and thus "visible" to, only one particular user group, for example.

BRIEF DESCRIPTION OF THE DRAWINGS

The invention will become more apparent from the following description of two embodiments when taken in conjunction with the accompanying drawings, in which.

DETAILED DESCRIPTION OF THE INVENTION

Managed objects are images of physical or virtual components of the network element which describe the static and dynamic properties of the respective component. A managed object is an instance of a managed-object class. Such a managed-object class is defined by its attributes, the operations that can be performed by its objects, the notifications that can be emitted by its objects, and its related behavior. Each managed object has an unambiguous, distinguished name. From a management point of view, a managed object exists if it has a distinguished name and supports the operations and notifications defined for its class.

The entirety of the managed objects existing in a network element, together with their attributes, is referred to as the Managed Information Base (MIB), and reflects the current configuration of the network element. The managed objects are stored in a memory (generally a RAM) or saved in a database contained in a read-only memory (e.g. a hard disk) of the network element. This database is also referred to as a persistent database.

Access to a managed object is obtained by an access request. Access requests from external users, such as queries from the superordinate management system, have a fixed structure and language, namely the Common Management Information System Element (CMISE) and the Common Management Information Protocol (CMIP). Internal access requests between managed objects are also possible.

Different access requests can be applied to managed objects, as is described in CCITT Recommendation C.720 (01/92), namely, inter alia:

GET to read the value of an attribute of a managed object;

SET to assign a value to an attribute of a managed object;

ACTION to perform an operation on a managed object;

CREATE to create a new managed object of a specified managed-object class; and

DELETE to delete an existing managed object.

Which access requests can be applied to a managed object is fixed in the definition of its object class.

A basic idea of the invention is to predefine access rights to managed objects and their attributes and store them in a service profile. Use is made of service profiles in tabular form. If a request for access to a managed object is to be executed, i.e., if the managed object is to be accessed, a check is made on the basis of the service profile to determine whether the accessing user has the necessary access right or not. If the user has the access right, the access request will be executed; otherwise an error message will be generated and the access will be denied. According to an advantageous aspect of the invention, different user categories are provided and the access rights for each user category to each managed object are defined in the form of service profiles.

Figure 1:
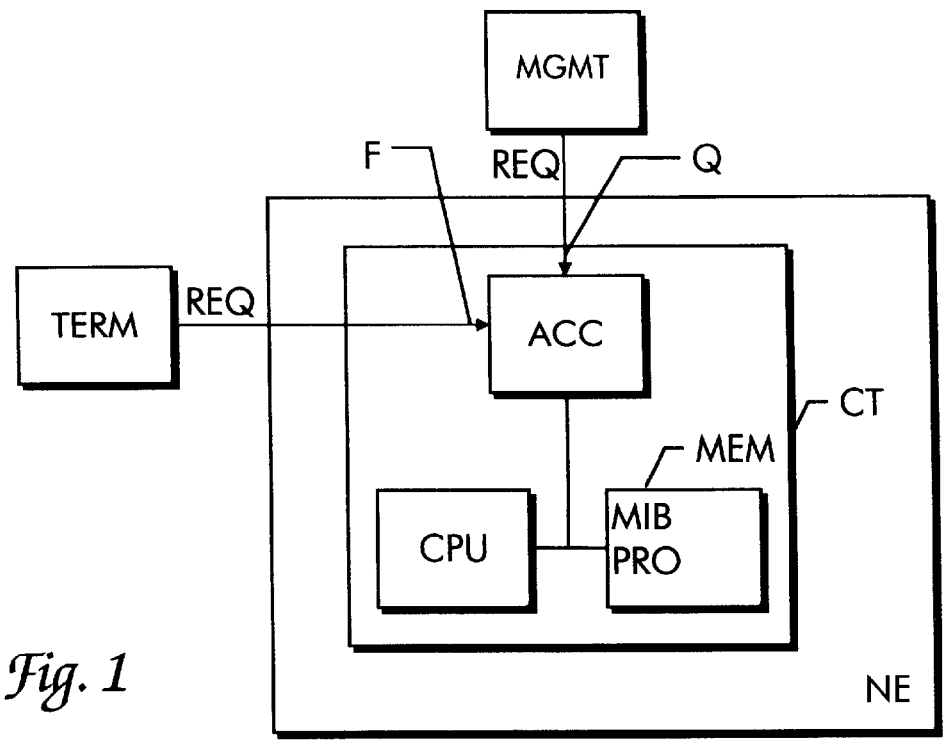
FIG. 1 shows a first embodiment of a network element in accordance with the invention.

A first embodiment of the invention is shown schematically in FIG. 1. A network element NE has a controller CT with a memory MEM, a processor CPU, and an access unit ACC. The memory MEM contains the Management Information Base MIB. The MIB consists of a number of managed objects. Also stored in the memory MEM is a service profile PRO which contains the access rights to the managed objects and their attributes.

In the first embodiment, the network element NE is a crossconnect for a transmission network based on the synchronous digital hierarchy. Examples of managed objects of the crossconnect are objects for switched connections, for termination points of the switching matrix of the crossconnect, for physical assemblies and boards, and for result files of regular performance monitoring operations in the network element.

Via the access unit ACC, access requests REQ in the form of the above-mentioned CMISE requests are received from an external management facility MGMT. The service profile PRO in the memory MEM contains information about access rights of user groups to managed objects and their attributes. In the first embodiment, two external user groups, namely Q-interface users and F-interface users, and one internal user group for access requests among managed objects are provided. For the Q-interface user group, all management functions defined for the Q-interface QIF of the network management in the recommendations for the synchronous digital hierarchy (SDH) are to be permitted. The F-interface user group uses a proprietarily expanded Q-interface of the network element, which is referred to as an F-interface FIF, and has extended access rights. In the embodiment, the F-interface is used by a local terminal TERM for service personnel. All managed objects belong to the internal user group.

Figure 2:
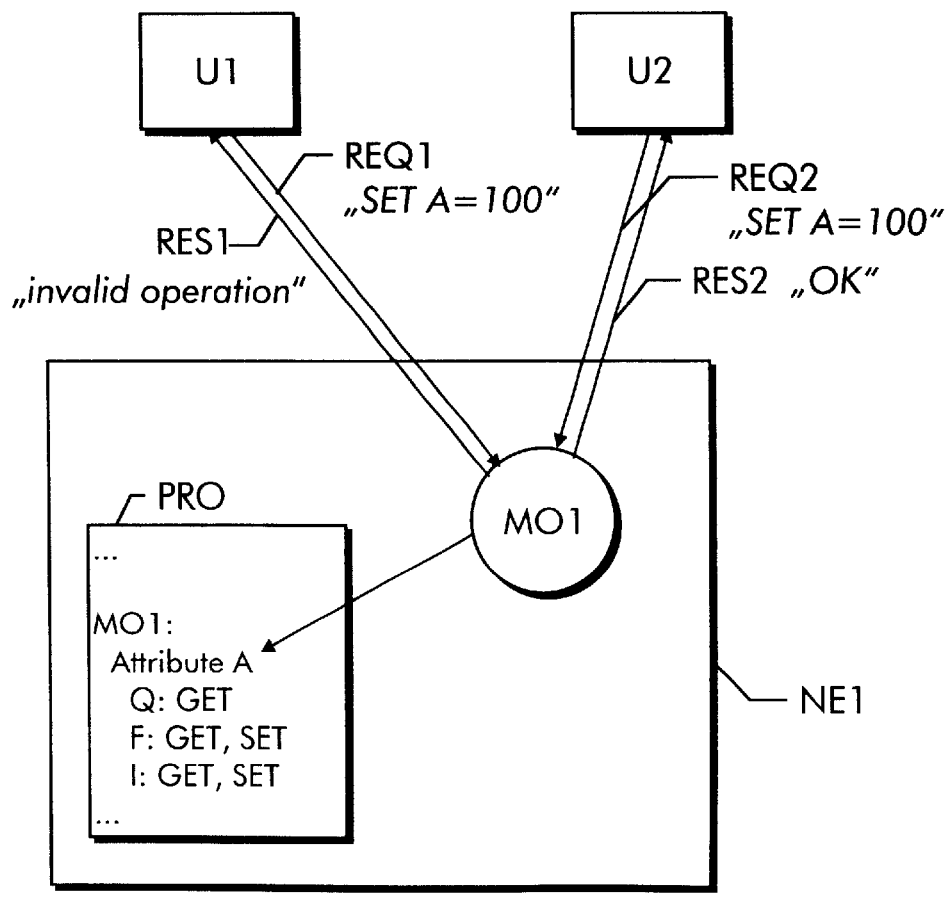
FIG. 2 shows a first example of the operation of the network element of FIG. 1.
Figure 3:
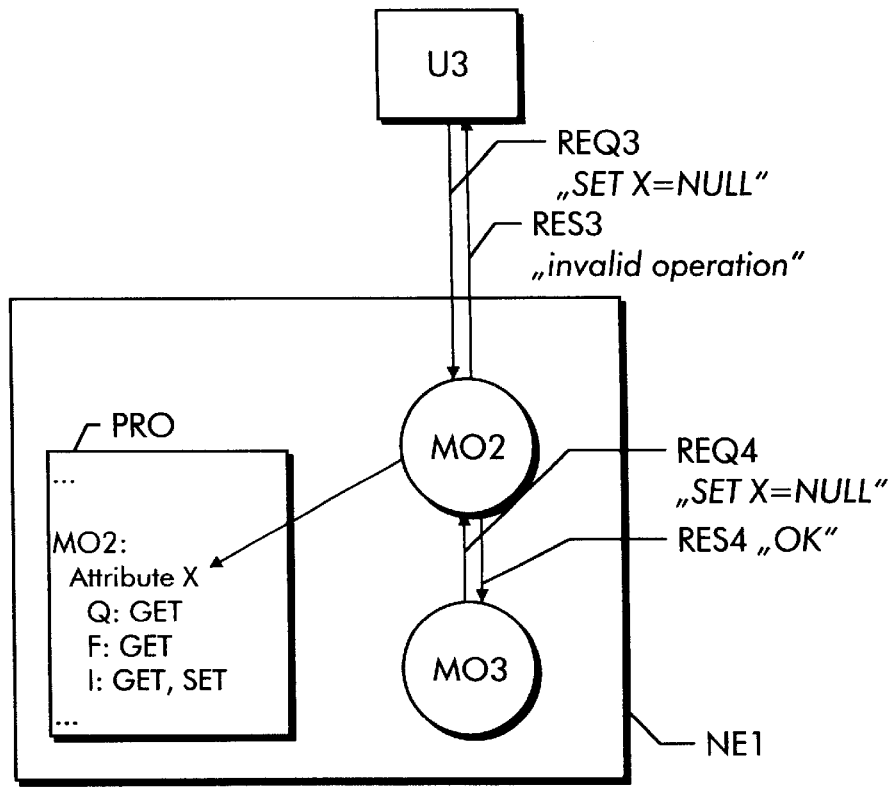
FIG. 3 shows a second example of the operation of the network element of FIG. 1.

FIG. 2 shows a first example of the operation of the first embodiment of the network element. A user U1 of the Q-interface user group Q sends a first access request REQ1 to the access unit in the network element. A first managed object MO1 is to be accessed, and its attribute A is to be set to a specified value, for example 100. The processor CPU now checks in the service profile PRO which access rights the user U1 or the Q-interface user group Q has for the attribute A of the managed object MO1: He only has the access right GET, i.e., he can only read the attribute A. Since the user U1 does not have the access right SET for the attribute A, the access request will be refused and the error message RES1, "invalid operation", will be sent to the user U1. The user cannot access the managed object MO1.

A second user U2 also sends an access request REQ2 to the network element NE1. The second user U2 belongs to the F-interface user group F, and also wants to set the attribute A of the managed object MO1 to 100. The service profile PRO contains the information that the F-interface user group F has the access rights GET and SET for the attribute A. Accordingly, the user U2 may both read and change the value of the attribute A. Since all access rights needed to execute the access request REQ2 are present, the access request REQ2 will be executed. The value of the attribute A will be set to 100, and the message RES2, "OK", will be sent to the user U2.

From this example it is apparent how access control and a restriction of access rights can be implemented using the service profile. One example of meaningful access control is the generation of a new managed object for a hardware board of the crossconnect. It may be appropriate to not permit an external management facility to generate such a managed object by denying the Q-interface user group the access right CREATE for this object class, whereas the generation of the object at the local terminal of the crossconnect is permitted via the F-interface by granting the F-interface user group the access right CREATE. This ensures that a new hardware board can be installed and configured only by service personnel. This also allows different functionalities to be implemented for different user groups. The external management facility will, as a rule, not be interested in hardware details of individual network elements, while the service personnel must be able to perform additional services on the network element for the purpose of maintenance.

In accordance with a process running in the controller, another managed object MO3 sends an internal access request REQ4, by which the attribute X of the managed object MO2 is to be changed. The managed object MO3 belongs to the internal user group INT, to which intrasystem processes are assigned.

According to the entry. in the service profile, the access rights GET and SET exist. Thus, the access request will be executed, since the required access rights SET is present for the internal user group INT. As a response RES4, an "OK" is sent to the requesting managed object MO3.

From the second example of the operation of the network element it is apparent how the control of access rights during communication between managed objects is implemented in a simple manner without having to incorporate a separate routine into the interobject communication of the "framework" of the network controller for each individual case.

Figure 4:
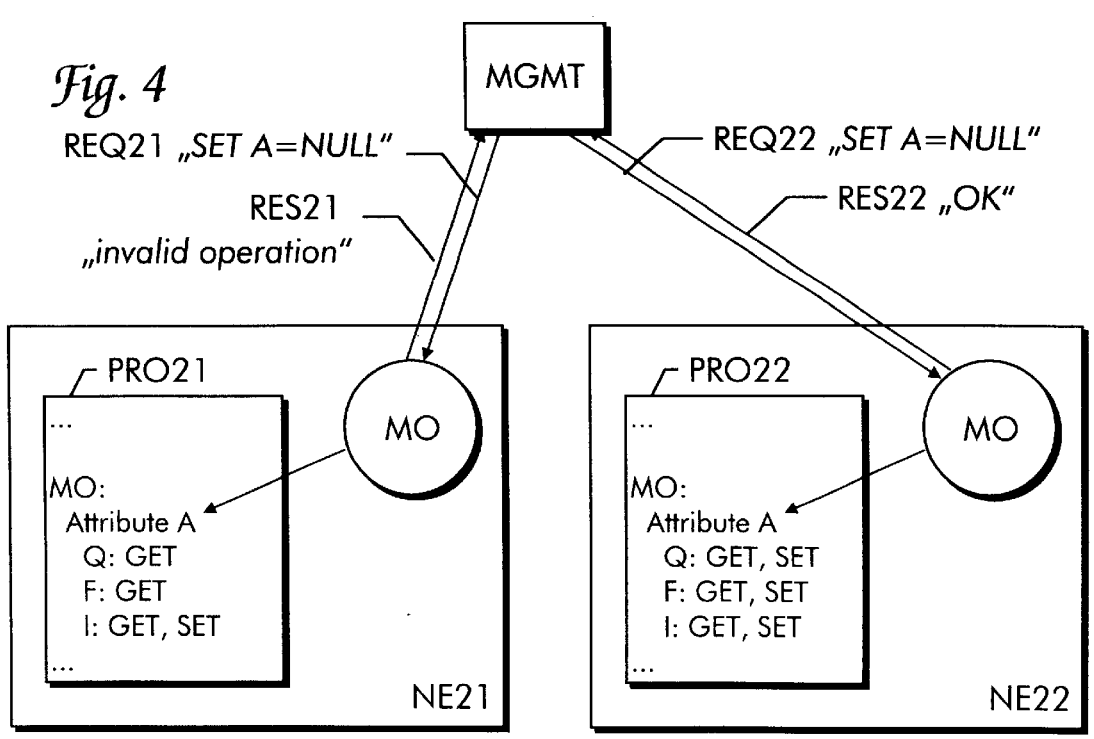
FIG. 4 shows a third example of the operation of the network element of FIG. 1 in a second embodiment using two network elements.

A third example of the operation of the network element according to the invention will now be described with reference to FIG. 4, which represents a second embodiment using two network elements NE21 and NE22 of a synchronous digital communications system. Both are controlled by a management facility MGMT. Each of the network elements is of the type shown in FIG. 1, the two network elements being identical in construction except for the fact that they are provided with different service profiles PRO21, PRO22.

The management facility MGMT sends to the first network element NE21 a first access request REQ21 to set the attribute A of the managed object MO to a specified value. The controller of the first network element NE21 checks in the service profile PRO21 the access rights entered for the managed object MO, determines that only the access right GET, but not SET, is present for the attribute A of the managed object, and therefore refuses the execution of the access request. An error message RES21, "invalid operation", is sent to the management facility.

The management facility MGMT also sends to the second network element NE22 an access request REQ22 to set the attribute A of the managed object MO to a specified value. The controller of the second network element NE22 now checks in its service profile PRO22 the access rights entered for the managed object MO, and determines that the access rights GET and SET have been granted for the attribute A of the managed object. Since the required access right SET is present, the access request will be executed, the attribute A will be set to the specified value, and as the result of the operation, the controller will send the message RES22, "OK", to the management facility.

Figure 5:
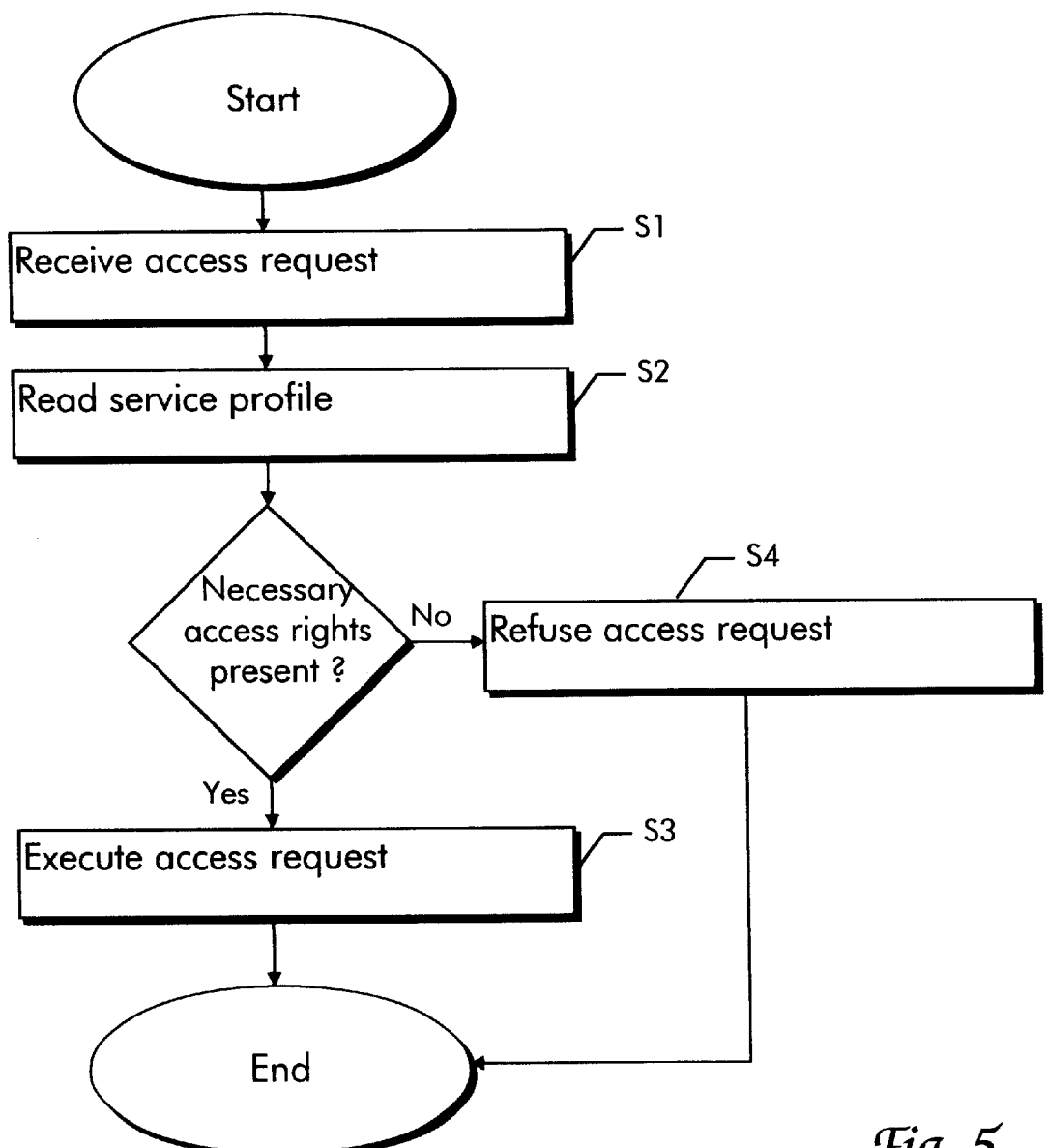
FIG. 5 is a flowchart of the control method in accordance with the invention.

Referring now to FIG. 5, a flowchart depicting the control method of the present invention is illustrated. An access request to access a managed object is received from an accessing user in step S1. The service profile is then checked to determine whether the accessing user has the necessary rights to access the managed object as depicted in step S2. If the accessing user has access rights, the access request will be executed as shown in step S3. Otherwise, as illustrated in step S4, the accessing user will be denied access to the managed object and an error message will be generated.

From the third example of the operation of a network element according to the invention it is apparent that network elements with different functionalities can be implemented with identical hardware and software by simply loading different service profiles. Thus, for example, one equipment version with standard functions and one equipment version with an extended or restricted set of functions can be implemented with identical hardware and software.

It is particularly advantageous if the service profile is loadable dynamically during the run time, i.e., if it can be loaded or replaced during operation of the network element. In that case, a check for access rights is always made with the current service profile, so that the functionality of a network element can be changed, i.e., extended, during operation.

A further advantage results if the service profile is present in tabular form and is encoded as an ASCII file. The service profile can then be read and changed with any text editor. This enables maintenance personnel to check and change the set of possible functions of the network element defined by the service profile. The service profile could also be protected against changes by a license mechanism.

According to a further development of the invention, a separate service profile is provided for each managed-object class. Then, the memory needs to contain only those service profiles for whose associated class a managed object currently exists. In that case, the association between managed object and service profile is established via the object class to which a managed object belongs.

What is claimed is:

1. A network element (NE) for a communications network, comprising:
   a controller (CT) including a processor (CPU) for executing an access request (REQ), a memory (MEM) for storing managed objects (MO1, MO2, MO3, MO), and
   an access unit (ACC) for receiving at least one access request (REQ),
   wherein the controller controls the network element using the managed objects (MO1, MO2, MO3, MO) as images of the static and dynamic properties of resources of the network element (NE), wherein,
   a service profile stores information about the access rights to the managed objects (MO1, MO2, MO3, MO) in the memory, and
   a processor (CPU) determines whether access rights to managed objected needed to execute the access request REQ are present.

2. A network element as claimed in claim 1, wherein the service profile (PRO) contains information about access rights of different user groups (Q, F, I) to the managed objects (MO1, MO2, MO3, MO).

3. A network element as claimed in claim 2, wherein the service profile (PRO) contains information about access rights of at least one external user group (Q, F) and an internal user group (I).

4. A network element as claimed in claim 1, wherein a service profile is stored for each managed-object class.

5. A network element as claimed in claim 1, wherein the service profile is loadable dynamically during operation of the network element.

6. A network element as claimed in claim 1, wherein the service profile is an ASCII table.

7. A method of controlling a network element for a communications network including:
   receiving (S1) an access request (REQ) from a user (U1, U2, U3, MGMT);
   checking (S2) whether in a service profile (PRO) access rights to managed objects (MO1, MO2, MO3, MO) needed to execute the access request (REQ) are present for the user (U1, U2, U3, MGMT), said managed objects representing images of static and dynamic properties of resources of the network element;
   executing (S3) the access request (REQ) if the access rights are present and refusing (S4) the access request if the access rights are not present.

8. A method as claimed in claim 7, further determining which user group (Q, F, I) the user (U1, U2, U3, MGMT) belongs to; and
   determining, by checking the service profile (PRO) whether the access rights to the managed objects (MO) needed to execute the access request (REQ) are present for the user (U1, U2, U3, MGMT) of the determined user group.

9. A controller (CT) for controlling a network element (NE) of a communications network comprising:
   at least one managed object (MO1, MO2, MO3, MO), the managed objects being images of the static and dynamic properties of resources of the network element (NE),
   a controller (CT) including,
   a processor (CPU) for executing an access request (REQ),
   a memory (MEM) for storing managed objects (MO1, MO2, MO3, MO), and
   an access unit (ACC) for receiving an access request (REQ), wherein
   a service profile stores information about the access rights to the managed objects (MO1, MO2, MO3, MO) in the memory, and
   a processor (CPU) determines whether an access request to a managed object can be executed based on the access rights stored in the service profile.

* * * * *